United States Patent
Sukeforth et al.

(10) Patent No.: US 10,145,159 B2
(45) Date of Patent: Dec. 4, 2018

(54) COLLAPSIBLE CHILD CONVEYANCE DEVICE

(71) Applicant: MONAHAN PRODUCTS, LLC, Hingham, MA (US)

(72) Inventors: Carl J. Sukeforth, Milton, MA (US); Richard M. Bastien, Cumberland, RI (US)

(73) Assignee: MONAHAN PRODUCTS, LLC, Hingham, MA (US)

( * ) Notice: Subject to any disclaimer, the term of this patent is extended or adjusted under 35 U.S.C. 154(b) by 0 days.

(21) Appl. No.: 14/098,209

(22) Filed: Dec. 5, 2013

(65) Prior Publication Data
US 2015/0159414 A1    Jun. 11, 2015

(51) Int. Cl.
| E05D 11/10 | (2006.01) |
| B62B 7/08 | (2006.01) |
| F16C 11/04 | (2006.01) |
| F16C 11/10 | (2006.01) |

(52) U.S. Cl.
CPC .......... E05D 11/1007 (2013.01); B62B 7/08 (2013.01); E05D 11/1028 (2013.01); F16C 11/045 (2013.01); F16C 11/10 (2013.01); F16C 2326/20 (2013.01); Y10T 16/52 (2015.01); Y10T 16/54 (2015.01)

(58) Field of Classification Search
CPC ... E05D 11/06; E05D 11/107; E05D 11/1014; E05D 11/1028; E05D 11/1007
See application file for complete search history.

(56) References Cited

U.S. PATENT DOCUMENTS

| 659,878 | A | * | 10/1900 | Smith | 16/347 |
| 784,574 | A | * | 3/1905 | Langdon | 16/332 |
| 3,955,240 | A | * | 5/1976 | Schuh et al. | 16/326 |
| 4,286,353 | A | * | 9/1981 | Roche | 16/341 |
| 5,054,165 | A | * | 10/1991 | Marchione | 16/270 |
| 5,142,739 | A | * | 9/1992 | Lin | 16/326 |
| 5,251,359 | A | * | 10/1993 | Finkl | 16/349 |
| 2003/0037412 | A1 | | 2/2003 | Lee | |
| 2005/0092549 | A1 | * | 5/2005 | Winslow | 182/163 |
| 2005/0110308 | A1 | | 5/2005 | Church et al. | |
| 2005/0166364 | A1 | * | 8/2005 | Lee | 16/324 |
| 2007/0101493 | A1 | * | 5/2007 | Campbell | A47D 7/002 5/99.1 |
| 2011/0108079 | A1 | | 5/2011 | Mallookis et al. | |

(Continued)

FOREIGN PATENT DOCUMENTS

| CN | 1618376 A | 5/2005 |
| CN | 102101490 A | 6/2011 |
| EP | 1533206 A1 | 5/2005 |

(Continued)

OTHER PUBLICATIONS

Extended European Seach Report from corresponding Euopean Application No. 14195248.1 dated Jun. 3, 2015.

*Primary Examiner* — Emily M Morgan
(74) *Attorney, Agent, or Firm* — Lando & Anastasi, LLP (57) ABSTRACT

Aspects and embodiments of the present disclosure are directed generally to a a hinge for a child conveyance device including a means for coupling two non-circular elements that rotate with respect to one another, wherein the two non-circular elements are configured to avoid the pinching of fingers during rotation.

18 Claims, 8 Drawing Sheets

(56) References Cited

U.S. PATENT DOCUMENTS

2011/0148076 A1    6/2011  Chen

FOREIGN PATENT DOCUMENTS

| EP | 2426029 A2 | 3/2012 |
| GB | 2497764 A | 6/2013 |
| GB | 2497765 A | 6/2013 |
| WO | 2012/135907 A1 | 10/2012 |

* cited by examiner

COLLAPSIBLE CHILD CONVEYANCE DEVICE

BACKGROUND

Aspects and embodiments of the present disclosure are directed generally to child conveyance devices, for example, strollers and/or car seats, and to hinges on such child conveyance devices.

SUMMARY

In accordance with an aspect of the present disclosure there is provided a hinge for a child conveyance device. In some embodiments, the hinge includes an outer non-circular hub element comprising a first side and second side, wherein the first side and second side define a groove. An inner non-circular hub element is coupled to the outer non-circular hub element and configured to fit at least partially within the groove of the outer non-circular hub element. A width of the groove is less than about 9 millimeters.

In some embodiments, the width of the groove is between about 5 and about 9 millimeters.

In some embodiments, the outer non-circular hub element is coupled to the inner non-circular hub element at a point off-centered from a center line or centroid of the outer non-circular hub element.

In some embodiments, the hinge further comprises a first leg coupled to the outer non-circular hub element, a second leg coupled to the inner non-circular hub element, and a locking mechanism including a carriage biased toward the inner non-circular hub element and configured to engage a notch in the inner non-circular hub element, engagement of the carriage with the notch locking the first leg and the second leg in a position relative to one another. The carriage and a mechanism for biasing the carriage toward the inner non-circular hub element may be disposed in the second leg.

Some aspects are directed toward a child conveyance device including a frame assembly including the hinge.

Some aspects are directed toward a hinge including an outer non-circular hub element and an inner non-circular hub element coupled to the outer non-circular hub element and configured to rotate within the outer non-circular hub element, the inner non-circular hub element including a rounded edge defined by a surface between a planar surface of the inner non-circular hub element and a rim surface of the inner non-circular element.

In some embodiments, the inner non-circular hub element comprises a notch configured to engage with a carriage to lock the hinge. In some embodiments, the notch comprises one or more surfaces angled and angles greater than about 90 degrees relative to an adjacent surface of the notch. The notch may include a first side wall sloped at an angle greater than about 90 degrees relative to an adjacent second side wall of the notch. The carriage may include ramped external surfaces configured to engage the first side wall of the notch and the second side wall of the notch when the hinge is in a locked position.

Some aspects are directed toward a hinge including an outer non-circular hub element including a groove and an inner non-circular hub element coupled to the outer non-circular hub element and configured to rotate within the groove of the outer non-circular hub element, wherein a surface of the inner non-circular hub element is sloped at an angle greater than about 90 degrees relative to a planar surface of the inner non-circular hub element.

In some embodiments, the surface is sloped at an angle of greater than about 110 degrees relative to the planar surface of the inner non-circular hub element. In some embodiments, a second surface of the outer non-circular hub element is sloped at an angle greater than about 90 degrees relative to a planar surface of the outer non-circular hub element. In some embodiments, the second surface is sloped at an angle of greater than about 110 degrees relative to the planar surface of the outer non-circular hub element.

In some embodiments, the hinge further includes a first inset element disposed between a first surface of the inner non-circular hub element and a first surface of the outer non-circular hub element.

In some embodiments, the hinge further includes a second inset element disposed between a second surface of the inner non-circular hub element and a second surface of the outer non-circular hub element.

In some embodiments, the first and second inset elements each include a plate made of a low-friction material.

In some embodiments, the first and second inset elements each comprise a pad made of a low-friction material.

Some aspects are directed toward a hinge for a child conveyance device including a means for coupling two non-circular elements that rotate with respect to one another, wherein the two non-circular elements are configured to avoid the pinching of fingers during rotation.

Some aspects are directed toward a hinge for a child conveyance device including an outer non-circular hub element comprising a first side and second side, wherein in the first side and second side define a groove, an inner non-circular hub element configured to fit at least partially within the groove of the outer non-circular hub element, and a means for coupling the outer non-circular hub element and the inner non-circular hub element.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Parents or caregivers of young children or babies may transport a child in child conveyance devices, such as car seats and strollers. Such devices are more convenient to transport or store if the devices can collapse or otherwise be configured to take up less space when the child is not in the device. The devices can be configured to collapse by coupling components of a frame of the devices with hinges, in a manner which would allow the frame to fold.

Generally, operation of a hinge can result in pinching of fingers or skin within the hinge. Such pinching can be particularly problematic on a child conveyance device, as children and babies' fingers can be smaller and more delicate, thus more susceptible to pinching and with greater consequence.

Aspects and embodiments of the present disclosure are related to a hinge for use on child conveyance devices. As used herein the term "child conveyance device" includes any apparatus, mobile or stationary, in which a child may be placed wherein it may be desirable to include elements that fold or move by coupling with a hinge. For example, a child conveyance device may be any of a stroller, a car seat, or a child swing.

Figure 1:
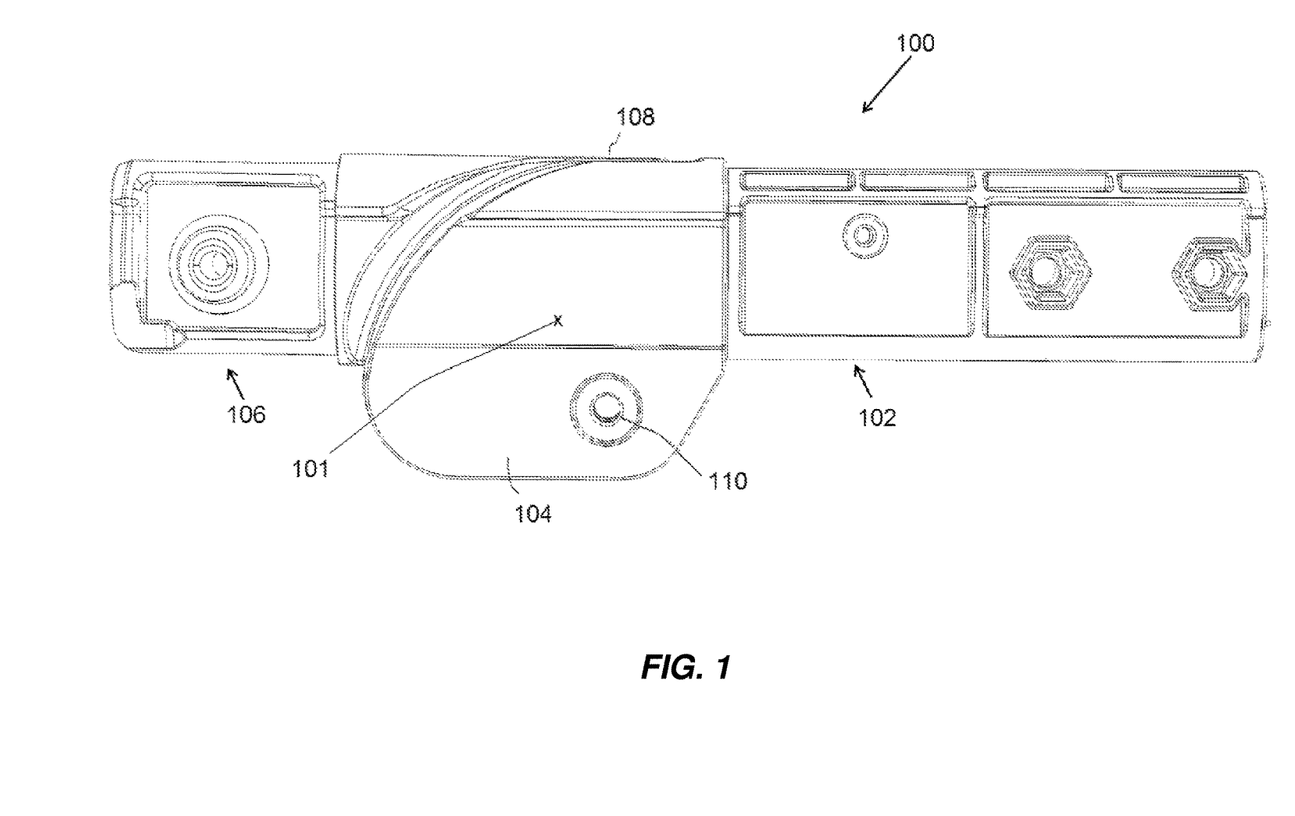
FIG. 1 is an elevational view of a hinge in accordance with some embodiments of the present disclosure.
Figure 2:
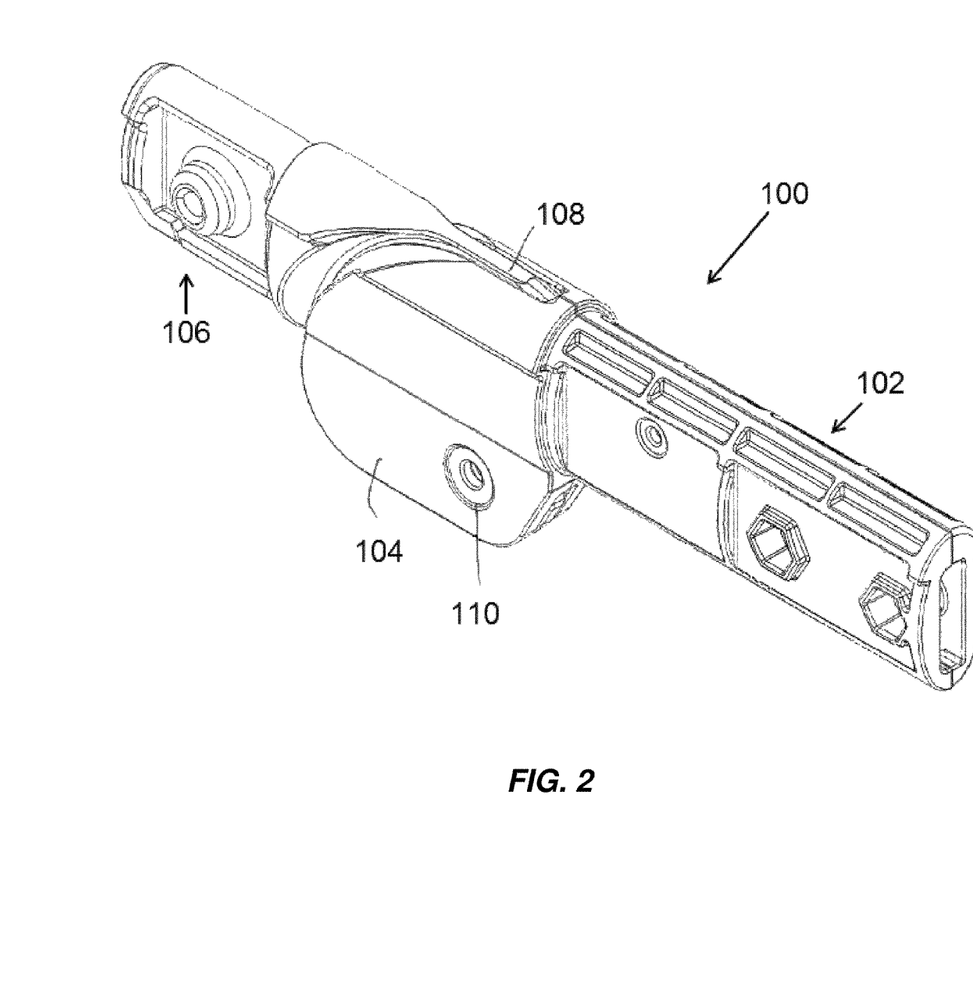
FIG. 2 is an isometric view of a hinge in accordance with some embodiments of the present disclosure.
Figure 3:
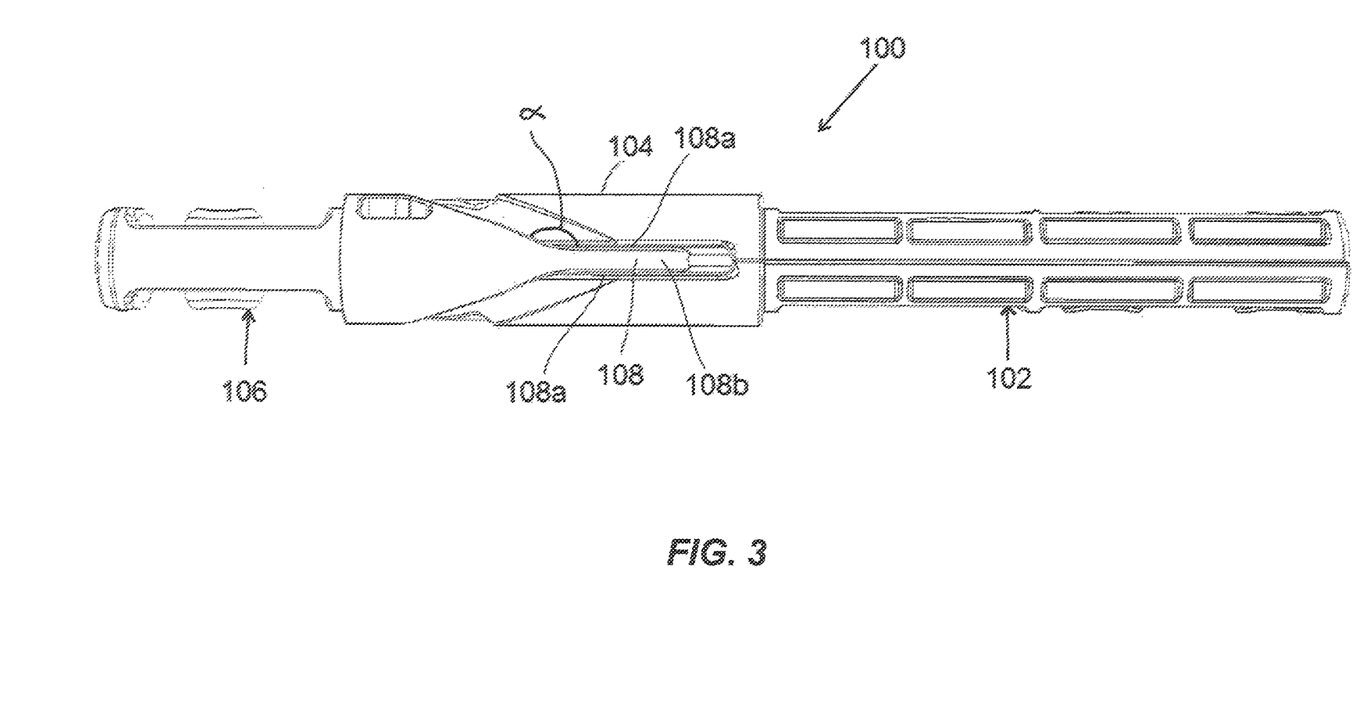
FIG. 3 is a plan view of a hinge in accordance with some embodiments of the present disclosure.

Referring to FIGS. 1, 2, and 3, in some embodiments, a hinge 100 includes a first leg 102 and a second leg 106. The first leg 102 and the second leg 106 are coupled at a pivot point 110. The first leg 102 includes an outer hub 104. The second leg 106 includes a relatively planar surface forming an inner hub 108. The inner hub 108 of the second leg 106 is designed to fit in the outer hub 104 of the first leg 102 so that the inner hub 108 can rotate within the outer hub 104 about the pivot point 110. The pivot point 110 may be off centered from a centroid 101 or center line of the outer hub 104 and/or inner hub 108. The first leg 102 and second leg 106 may be coupled to additional components to constitute a frame assembly or a portion of a frame assembly for a child conveyance device.

In some embodiments, the inner hub 108 and/or the outer hub 104 are non-circular elements which may be partially circular or curved in shape. In some embodiments, the inner hub 108 and/or the outer hub 104 do not include curved portions. In other embodiments, the inner hub 108 and/or the outer hub 104 may be circular or substantially circular elements.

In some embodiments, the hinge 100 is designed to lock into a position when the hinge 100 is extended. Locking of the hinge 100 may include releasably retaining the first leg 102 and the second leg 106 at a fixed angle or position relative to one another or releasably securing the first leg 102 to the second leg 106 at a fixed angle or position relative to one another. The locking mechanism is described further below with reference to FIGS. 6 and 7. In some embodiments, the hinge 100 may lock when the hinge is in a fully extended position, such as when the first leg 102 and the second leg 106 are substantially aligned at a 180-degree angle. In some embodiments, the hinge 100 may lock when the hinge 100 is not fully extended or when the first leg 102 and second leg 106 are approximately parallel. In various embodiments, the hinge 100 may lock with the first leg 102 and the second leg 106 disposed at any angle between 0 degrees and 180 degrees relative to each other, for example, at angles of 45 degrees, 90 degrees, or 135 degrees relative to each other. Embodiments disclosed herein are not limited to any particular angle between the first leg 102 and the second leg 106 at which the hinge may lock. In some embodiments, an angle between the first leg 102 and the second leg 106 at which the hinge may lock may be adjustable and/or the hinge may be configured to lock at with the first leg 102 and the second leg 106 disposed at any of a plurality of different angles relative to one another.

Figure 4:
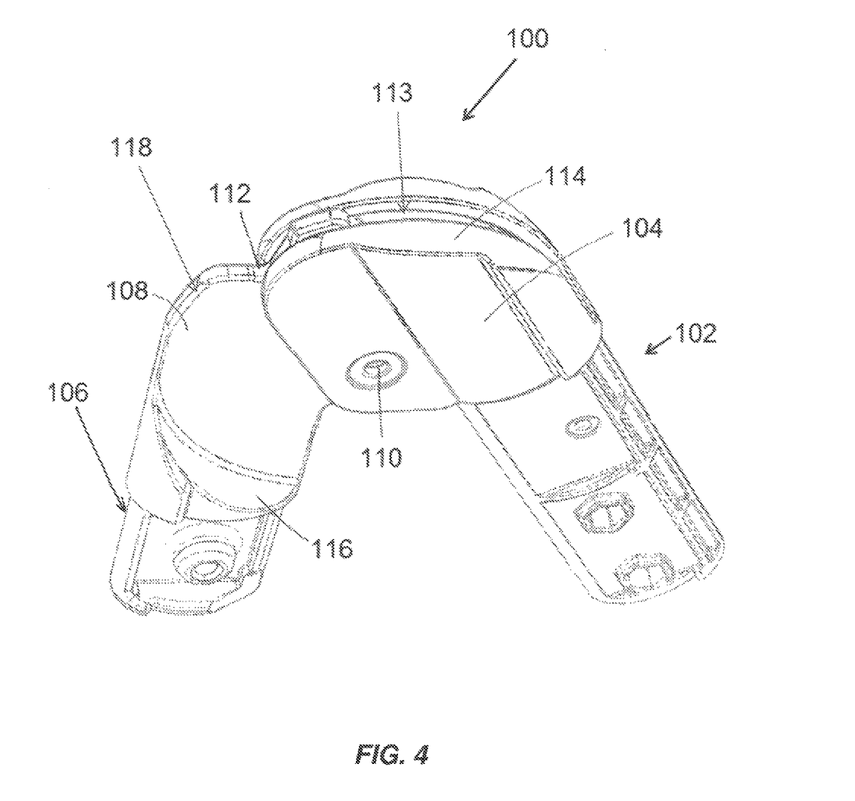
FIG. 4 is an isometric view of a hinge in accordance with some embodiments of the present disclosure.

FIG. 4 shows the hinge 100 in a flexed position. In some embodiments, the non-hub portions of the first leg 102 and the second leg 106 may have an elliptical cross-sections. In other embodiments, the non-hub portions of the first leg 102 and/or the second leg 106 may have circular cross-sections, rectangular cross-sections, or cross-sections of any desired geometric shape. The-cross sections of the non-hub portions of the first leg 102 and/or the second leg 106 may change in shape or size along the length of the first leg 102 and/or the second leg 106. The cross-section of at least a portion of the non-hub portion of the first leg 102 may differ from the cross-section of at least a portion of the non-hub portion of the second leg 106.

The second leg 106 may taper so that the inner hub 108 is flatter than the remainder of the second leg 106 so that the inner hub 108 can fit into a groove 113 of the outer hub 104. A tapered section 116 of the second leg 106 may be configured to direct fingers and other flesh away from the hubs 104, 108 as the hubs 104, 108 rotate. The tapered section 116 may be disposed between and couple the inner hub 108 to the non-hub portion of the second leg 106. The tapered section 116 may be chamfered or sloped on one or both of a first and a second surface so that when the inner hub 108 rotates into the outer hub 104, fingers will slide up the slope of the tapered section 116 away from the rotating hubs 104, 108, rather than getting caught in between the hubs 104, 108 and the remainder of the second leg 106. For example, one or both of the first and second surfaces of the tapered section 116 may be sloped at an obtuse angle α of greater than about 90 degrees, greater than about 100 degrees, greater than about 110 degrees, or greater than about 120 degrees relative to a flat surface of the inner hub 108 and/or relative to a flat outer surface of the outer hub 104. The tapered section 116 may in some embodiments include curved first and the second surfaces. The first and second surfaces may taper at the same or different angles relative to a planar surface of the inner hub 108 or may curve in a similar or different manner relative to a planar surface of the inner hub 108.

In some embodiments, the outer hub 104 may have a corresponding outer tapered section 114, which may be designed to direct fingers away from the rotating hubs 104, 108. The tapered section 114 may include surfaces which are chamfered, sloped, or curved relative to a planar surface of the outer hub 104 in a similar manner as the tapered section 116 of the second leg 106 is chamfered, sloped, or curved relative to a planar surface of the inner hub 108. The tapered section 114 of the first leg 102 will force fingers and other flesh to slide away from an interface between the hubs 104, 108 upon the closing of the hubs 104, 108 as the inner hub 108 rotates into the outer hub 104. The degree of slope, curvature, and the/or the shapes of the tapered sections 114, 116 of the outer hub 104 and of the second leg 106, respectively, may be substantially the same or may be different.

In some embodiments, the groove 113 of the outer hub 104 may be configured to prevent pinching of fingers and flesh. In some embodiments, the groove 113 of the outer hub 108 may have a width which is small enough so that fingers of a child and/or an adult would not be able to fit into the groove 113. For example, the width of the groove 113 may be less than about 9 mm, between about 9 mm and about 5 mm, or about 5 mm or less. The width of the inner hub 108 may be correspondingly sized to fit into a smaller-width groove.

In some embodiments, the inner hub 108 is configured to prevent scissoring, which can pinch fingers and flesh. The edges of the inner hub 108 may be configured to be blunted or rounded and not sharp. At least one edge of the inner hub 108 may be shaped or may include an additional surface 118 such that a planar surface 108a of the inner hub 108 and a rim 108b of the inner hub 108 do not meet at a perpendicular angle. The additional surface 118 may provide an extra step between the planar surface 108a and rim surface 108b, allowing for a larger angle at an adjoining border between the planar surface 108a and rim surface 108b of the inner hub 108.

The inner hub 108 may also include a notch 112, which may be a part of a locking mechanism for the hinge, described further below. In some embodiments, the notch 112 may be configured to prevent pinching and scissoring of flesh. For example, the notch 112 may be sloped with obtuse angles that displace fingers or other body parts placed in the notch 112 in a direction outward from the outer hub 104 as the inner hub 108 rotates into the outer hub 104. The notch 112 may include a first side wall sloped at an obtuse angle greater than about 90 degrees relative to an adjacent second side wall of the notch in a plane defined by a planar surface of the inner hub. As the obtuse angle of the notch 112 directs away from the outer hub 104, as the hubs 104, 108 rotate a finger or other flesh present in the notch 112 would be directed out of the notch 112 instead of into a position pinched between the two hubs 104, 108. Other appropriate edges and components of the hubs 104, 108 and the first and second legs 102, 106 may be similarly configured to prevent pinching. For example, other components can also be sloped, use obtuse angles, and/or be configured to eliminate sharp edges.

Figure 5:
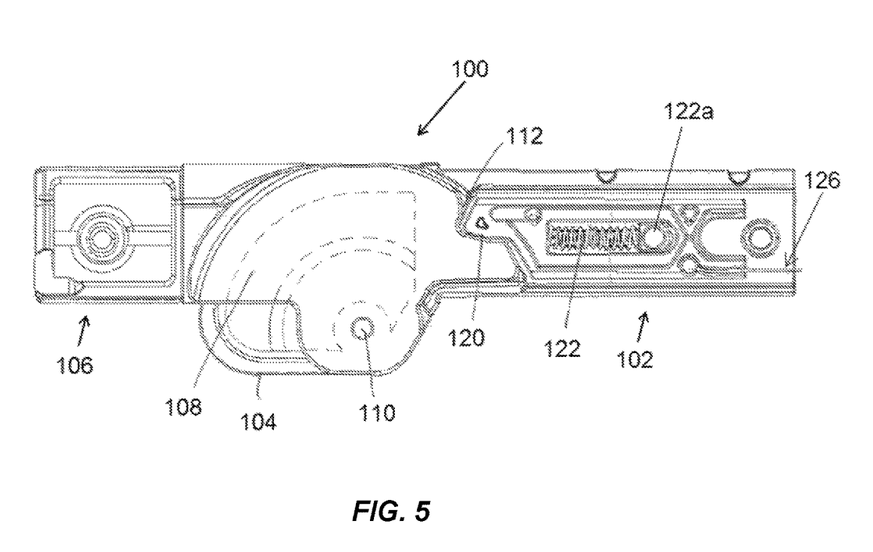
FIG. 5 is a cross-sectional view of a hinge in accordance with some embodiments of the present disclosure.
Figure 6:
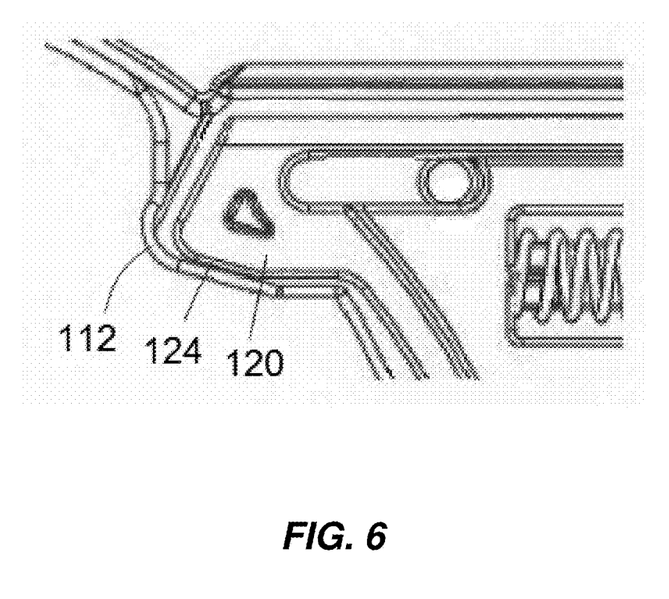
FIG. 6 is a cross-sectional view of a portion of a hinge in accordance with some embodiments of the present disclosure.

Referring to FIGS. 5 and 6, the hinge 100 may be configured to lock in a certain position. In some embodiments, the hinge 100 locks when the first leg 102 and the second leg 106 are positioned substantially at a 180-degree angle relative to one another. In some embodiments, the hinge 100 is locked into place by a carriage 120 in the first leg 102 which is pushed into the notch 112 of the inner hub 108 when the notch 112 is aligned with the carriage 120, for example, by rotating the first leg 102 and second leg 106 into positions at a substantially 180-degree angle relative to one another. The carriage 120 may be pushed into the notch 112 by a spring 122 to lock the hinge 100 into place. The spring 122 may be disposed within the first leg 102 and may be attached to a spring retainer 122a. The spring 122 may exert a force on the carriage 120 which pushes the carriage 120 away from the spring retainer 122a and toward the inner hub 108.

The carriage 120 may be shaped so that the rotation of the inner hub 108 forces the carriage 120 against the spring until the notch 112 of the inner hub 108 rotates past the carriage 120. Additionally, the carriage 120 may include a ramped end surface 124 designed to engage a ramped surface of the notch 112. The ramped surfaces of the carriage 120 and complementary ramped internal surfaces of the notch 112 may provide for a more obtuse angle of the notch 112 to prevent pinching, and also may provide for the carriage 120 to wedge into the notch to minimize rotational play in the hinge 100 when the hinge 100 is in a locked position. The carriage 120 may be released from the notch 112 using a pull cable 126, a switch, a lever, or other appropriate mechanism to allow the hinge to unlock and flex. While the hinge 100 of FIGS. 5 and 6 show the locked position to be one where the first leg 102 and second leg 106 are disposed in positions substantially 180 degrees apart, the hinge 100 may also or alternatively be locked in other positions. In some embodiments, the hinge 100 may have multiple locking positions. For example, the inner hub 108 may have more than one notch 112 at different locations on the inner hub 108 configured to engage the carriage 120.

Figure 7:
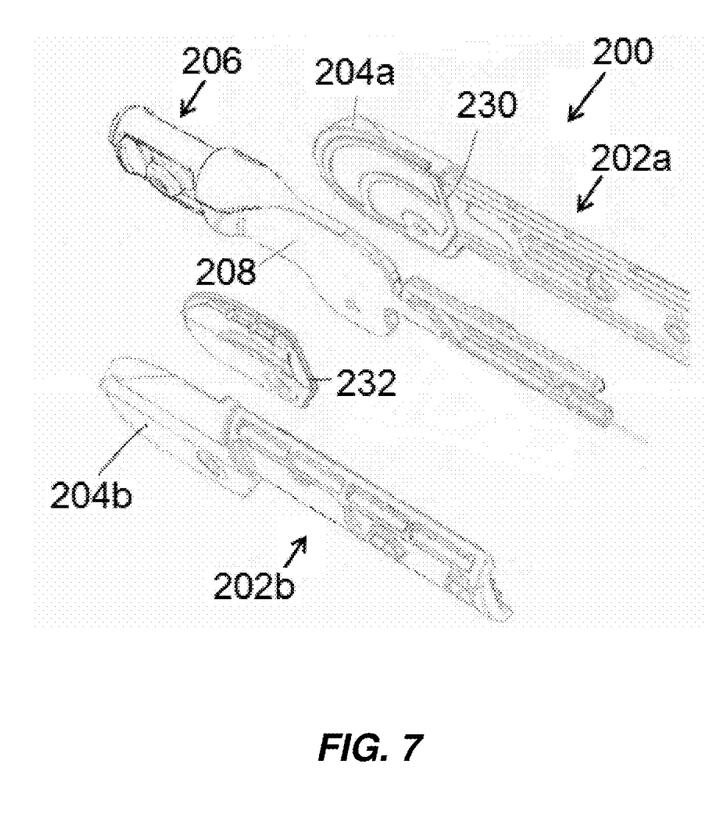
FIG. 7 is an exploded view of a hinge in accordance with some embodiments of the present disclosure.

FIG. 7 shows an exploded view of an embodiment of a hinge 200. The hinge 200 may include similar components as those described above, such as a first leg 202a, 202b with an outer hub and a second leg 206 with an inner hub 208. In some embodiments, the first leg may be made of two pieces 202a, 202b, which are coupled together around a portion of the second leg 206 and/or the inner hub 208. The hinge 200 may also include inset plates 230, 232. The inset plates 230, 232 may be made of or coated with a low-friction polymer such as polyoxymethylene (POM) or polytetrafluoroethylene (PTFE). The inset plates 230, 232 may be positioned between the inner hub 208 and the two sections of the outer hub 204a, 204b. The inset plates 230, 232 may minimize sliding friction between the plates of the inner hub 208 and outer hub to reduce wear on the hinge 200. The inner hub 208 and outer hub of the hinge 200 may be made of metal. For example, the inner and/or outer hubs may be forged or die-cast out of aluminum, magnesium zinc, or titanium. In other embodiments, the inner and/or outer hubs may be formed of a plastic material, for example, polyethylene or polypropylene. Embodiments of the hinge are not limited to any particular material of construction of the inner and/or outer hubs or of other components of the hinge.

Figure 8:
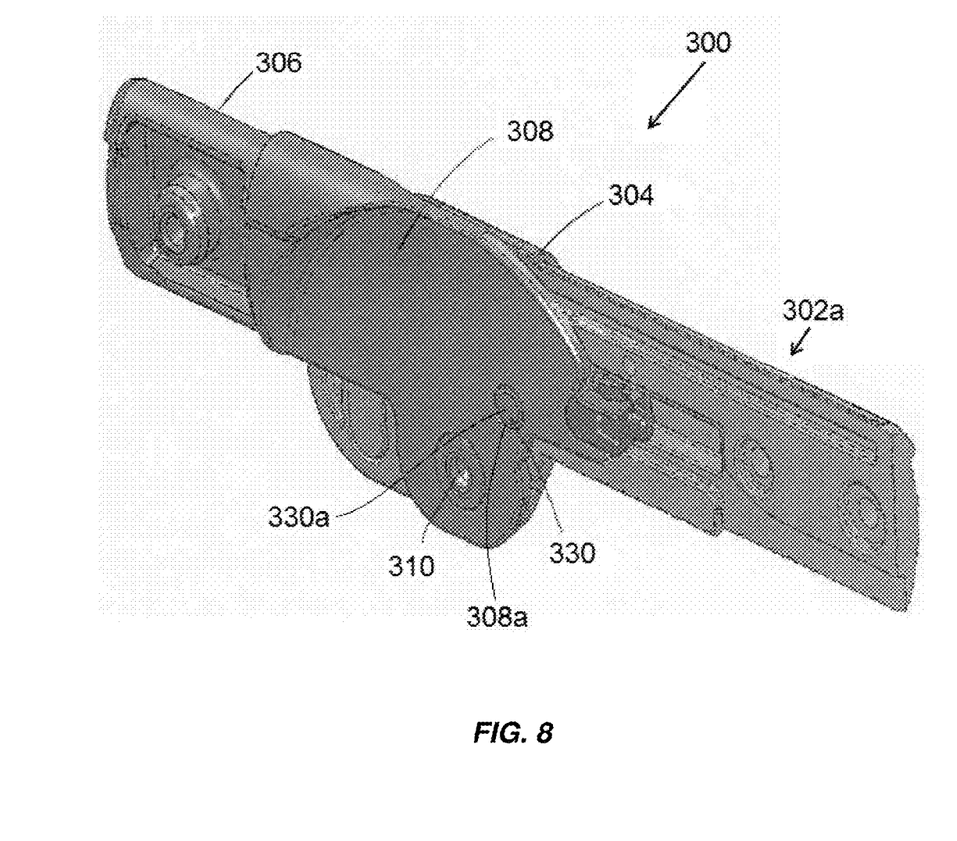
FIG. 8 is a cross-sectional isometric view of a hinge in accordance with some embodiments of the present disclosure.

FIG. 8 shows an embodiment of hinge 300 with an inset pad 330 present between a surface of the inner hub 308 and the side piece 302a of the first leg of the hinge 300. The inset pad 330 may be fixed in place on the inner hub 308 by a protrusion 330a disposed in an aperture 308a in the inner hub 308. An additional inset pad may be present between the opposite surface of the inner hub 308 and a second side piece of the first leg of the hinge 300. The second side piece of the first leg of the hinge 300 has been omitted from FIG. 8 to illustrate the internal features of the hinge 300. The inset pad 330 and the additional inset pad present between the inner hub 308 and the second side piece of the first leg of the hinge 300 may serve a similar function as the inset plates 230, 232 of the hinge 200 of FIG. 7. For example, the inset pads 330, 332 may be made of or coated with a low-friction polymer to minimize sliding friction between the metal plates of an inner hub 308 and an outer hub 304. The inset pads may be positioned on the inner hub 308, the outer hub 304, or trapped in between the hubs 304, 308. In some embodiments, one or more inset pads may be positioned around a pivot point 310.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:
1. A hinge for a child conveyance device, the hinge comprising:

a first leg including an outer non-circular hub element, the outer non-circular hub element including an outer tapered section, a first side, and second side, wherein the first side and second side define a groove, and the outer tapered section has a curved profile; and a second leg including an inner non-circular hub element coupled to the outer non-circular hub element and including a flat inner hub portion configured to fit at least partially within the groove of the outer non-circular hub element and a tapered section disposed between the flat inner hub portion and a non-hub portion of the second leg, the outer tapered section of the outer non-circular hub element corresponding to the tapered section of the inner non-circular hub element and opposing the tapered section of the inner non-circular hub element when the first leg is aligned with the second leg;

a locking mechanism including a carriage in the first leg biased toward the inner non-circular hub element and configured to engage a notch in the inner non-circular hub element, wherein engagement of the carriage with the notch locks the first leg and the second leg in a position relative to one another;

a ramped end surface on the carriage designed to engage a ramped surface of the notch; and a spring in the first leg being configured to exert a force on the carriage towards the inner non-circular hub element;

wherein the outer non-circular hub element is coupled to the inner non-circular hub element at a point displaced from a first end of the first leg; and the tapered section having a curved profile when viewed in a direction along an axis of rotation about the point.

2. The hinge of claim 1, wherein the width of the groove is between about 5 and about 9 millimeters.

3. The hinge of claim 1, wherein the point is displaced from a centroid of the outer non-circular hub element.

4. A hinge for a child conveyance device, the hinge comprising:

a first leg including an outer non-circular hub element including an outer tapered section; and a second leg including an inner non-circular hub element coupled to the outer non-circular hub element and configured to rotate within the outer non-circular hub element, the inner non-circular hub element including an additional surface defined by a surface disposed between a planar surface of the inner non-circular hub element and a rim of the inner non-circular hub element, a flat inner hub portion, and a tapered section disposed between the flat inner hub portion and a non-hub portion of the second leg, the outer tapered section of the outer non-circular hub element corresponding to the tapered section of the inner non-circular hub element and opposing the tapered section of the inner non-circular huh element when the first leg is aligned with the second leg;

wherein the outer non-circular hub element is coupled to the inner non-circular huh element at a point displaced from a first end of the first leg;

the outer tapered section having a curved profile when viewed in a direction along an axis of rotation about the point, and the tapered section having a curved profile when viewed in a direction along an axis of rotation about the point; and the outer tapered section and the tapered section being configured to cause a user's finger to slide up the respective outer tapered section and tapered section in a direction away from the inner non-circular hub element and the outer non-circular hub element as the inner non-circular hub element rotates into the outer non-circular hub element;

the inner non-circular hub element comprising a notch configured to engage with a carriage to lock the hinge, the carriage being disposed in the first leg; and wherein the notch includes a first side wall sloped at an angle greater than 90 degrees relative to an adjacent second side wall of the notch.

5. The hinge of claim 4, wherein the carriage includes ramped external surfaces configured to engage the first side wall of the notch and the second side wall of the notch when the hinge is in a locked position.

6. A hinge for a child conveyance device, the hinge comprising:

a first leg including an outer non-circular hub element including an outer tapered section and a groove; and a second leg including an inner non-circular hub element coupled to the outer non-circular hub element at a point and configured to rotate within the groove of the outer non-circular hub element, wherein a first surface of a tapered section of the inner non-circular hub element is sloped at an angle greater than 90 degrees relative to a planar surface of a flat inner hub portion of the inner non-circular hub element and a second surface of the tapered section opposite to the first surface is sloped at an angle greater than 90 degrees relative to the planar surface of the flat inner hub portion of the inner non-circular hub element, the outer tapered section and the first surface and the second surface of the tapered section being curved, the first surface of the tapered section and the second surface of the tapered section of the inner non-circular hub element disposed between the flat inner hub portion and a non-hub portion of the second leg, the outer tapered section of the outer non-circular hub element corresponding to the tapered section of the inner non-circular hub element and opposing the tapered section of the inner non-circular hub element when the first leg is aligned with the second leg;

the tapered section spanning a width of the inner non-circular hub element;

the outer tapered section having a curved profile when viewed in a direction along an axis of rotation about the point, and the tapered section having a curved profile when viewed in a direction along an axis of rotation about the point;

a locking mechanism including a carriage in the first leg biased toward the inner non-circular hub element and configured to engage a notch in the inner non-circular hub element, wherein engagement of the carriage with the notch locks the first leg and the second leg in a position relative to one another; and a spring in the first leg, the spring being configured to exert a force on the carriage towards the inner non-circular hub element.

7. The hinge of claim 6, wherein one of the first surface and the second surface of the tapered section is sloped at an angle of greater than 110 degrees relative to the planar surface of the flat inner hub portion of the inner non-circular hub element.

8. The hinge of claim 7, wherein a surface of the outer tapered section of the outer non-circular hub element is sloped at an angle greater than 90 degrees relative to a planar surface of the outer non-circular hub element.

9. The hinge of claim 8, wherein the surface of the outer tapered section is sloped at an angle of greater than 110 degrees relative to the planar surface of the outer non-circular hub element.

10. A hinge for a child conveyance device comprising:
an outer hub having an outer tapered section, the outer hub defining a groove;
a first leg of the child conveyance device coupled to the outer huh;
an inner hub having a planar surface configured to fit in the groove of the outer hub; and
a tapered section disposed between the inner huh and a non-hub section of a second leg of the child conveyance device, wherein the outer hub and the inner hub are coupled together such that the outer hub and the inner hub rotate with respect to one another, the outer tapered section of the outer hub corresponding to the tapered section of the inner hub and opposing the tapered section of the inner hub when the first leg is aligned with the second leg;
wherein the outer hub is coupled to the inner hub at a point adjacent to a first end of the first leg, but the point being displaced from a first end of the first leg; and
the outer tapered section having a curved profile when viewed in a direction along an axis of rotation about the point, and the tapered section having a curved profile when viewed in a direction along an axis of rotation about the point;
the inner hub comprising a notch configured to engage with a canine to lock the hinge, the carriage being disposed in the first leg; and
the notch including a first side wall sloped at an angle greater than 90 degrees relative to an adjacent second side wall of the notch.

11. A hinge for a child conveyance device comprising:
an outer non-circular hub element comprising an outer tapered section, a first side, and second side, wherein the first side and second side define a groove, the outer non-circular hub element coupled to a first, leg of the child conveyance device, the outer tapered section being curved; and
an inner non-circular hub element configured to fit at least partially within the groove of the outer non-circular hub element, the inner non-circular hub element connected to a second leg of the child conveyance device by a tapered section disposed between a flat surface of the inner non-circular hub element and the second leg, the tapered section including a surface sloped at an angle greater than 90 degrees relative to the flat surface of the inner non-circular hub element, the surface of the tapered section being curved, the outer non-circular hub element and the inner non-circular hub element being coupled together at a point, the outer tapered section of the outer non-circular hub element corresponding to the tapered section of the inner non-circular hub element and opposing the tapered section of the inner non-circular hub element when the first leg is aligned with the second leg; and
the outer tapered section having a curved profile, and the tapered section having a curved profile when viewed in a direction along an axis of rotation about the point;
the inner non-circular hub element comprising a notch configured to engage with a carriage to lock the hinge, the carriage being disposed within the first leg; and
the notch including a first side wall sloped at an angle greater than 90 degrees relative to an adjacent second side wall of the notch.

12. The hinge of claim 1, wherein the tapered section includes a tapered portion of a first side of the second leg and a tapered section of a second side of the second leg.

13. The hinge of claim 1, wherein the outer tapered section of the outer non-circular hub element includes a surface sloped at an angle greater than 90 degrees relative to a planar outer surface of the outer non-circular hub element.

14. The hinge of claim 1, wherein the notch includes a first side wall sloped at an obtuse angle greater than 90 degrees relative to an adjacent second side wall of the notch in a plane defined by a planar surface of the flat inner hub portion.

15. The hinge of claim 6, further comprising a first inset element disposed between a first inner non-circular huh element surface and a first outer non-circular hub element surface.

16. The hinge of claim 15, further comprising a second inset element disposed between a second inner non-circular hub element surface and a second outer non-circular hub element surface.

17. The hinge of claim 16, wherein the first inset element and the second inset element each include a low-friction material.

18. The hinge of claim 16, wherein the first inset element and the second inset element each comprise a pad made of a low-friction material.

* * * * *

UNITED STATES PATENT AND TRADEMARK OFFICE
CERTIFICATE OF CORRECTION

PATENT NO. : 10,145,159 B2
APPLICATION NO. : 14/098209
DATED : December 4, 2018
INVENTOR(S) : Carl J. Sukeforth et al.

Page 1 of 1

It is certified that error appears in the above-identified patent and that said Letters Patent is hereby corrected as shown below:

In the Claims

Column 7, Line 55, Claim 4, delete the word "huh" and insert --hub--; and
Column 7, Line 58, Claim 4, delete the word "huh" and insert --hub--.

Signed and Sealed this
Eighth Day of January, 2019

Andrei Iancu
*Director of the United States Patent and Trademark Office*